July 5, 1955  L. G. SAYWELL  2,712,460
LUBRICANT SEAL
Filed Oct. 16, 1950  2 Sheets-Sheet 1

INVENTOR.
Lawrence G. Saywell
BY
ATTORNEYS

July 5, 1955 L. G. SAYWELL 2,712,460
LUBRICANT SEAL
Filed Oct. 16, 1950 2 Sheets-Sheet 2
FIG_7_ 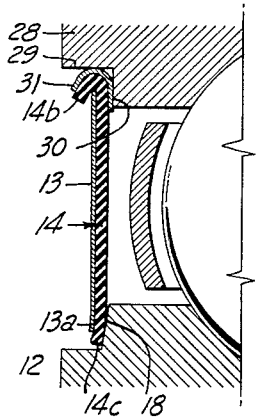
FIG_8_ 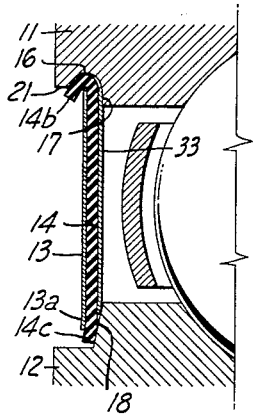
FIG_9_ 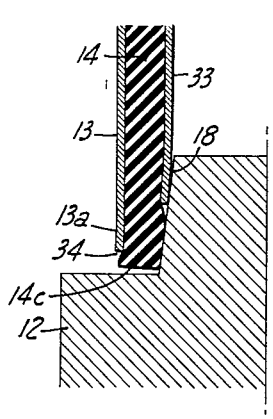
FIG_10_ 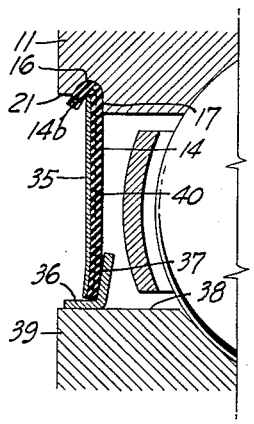
FIG_11_ 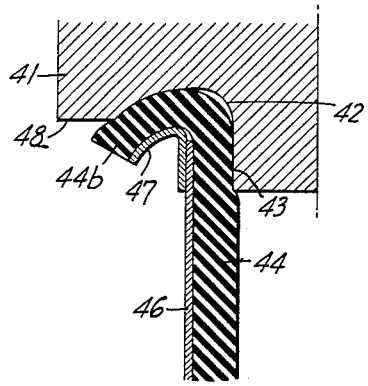
INVENTOR.
Lawrence G. Saywell
BY
ATTORNEYS United States Patent Office 2,712,460
Patented July 5, 1955

2,712,460

LUBRICANT SEAL

Lawrence G. Saywell, San Mateo, Calif., assignor to Saywell Associates, South San Francisco, Calif., a joint venture Application October 16, 1950, Serial No. 190,346

4 Claims. (Cl. 286—11)

This invention relates generally to lubricant seals of the type suitable for preventing loss of lubricant from ball or roller bearing assemblies.

In the past it has been proposed to apply lubricant sealing means directly between the outer and inner races of a ball or roller bearing assembly, thereby making possible a self contained assembly which can be factory lubricated. One such sealing means which has been manufactured commercially makes use of a rubber annulus which is retained within the outer race, and which has an inner feathered edge which seals upon an annular surface formed on the inner race. One difficulty with such a seal is that in time the rubber tends to take a permanent set, with the result that the annulus no longer makes good sealing engagement with the inner race. As disclosed for example in my copending application Serial No. 166,344 filed June 6, 1950, now U. S. Patent 2,600,434, issued June 17, 1952, I have provided an all metal seal for a ball or roller bearing assembly which avoids many of the difficulties inherent in seals making use of resilient rubber parts. However there are certain types of services to which an all metal seal is not well adapted, as for example where the speeds of rotation are not great, and where the seal may be subjected to the action of water or other liquids.

It is an object of the present invention to provide a novel form of lubricant seal which makes use of a resilient rubber part but which tends to avoid the inherent disadvantages of prior rubber seals.

A further object of the invention is to provide a lubricant seal of the above character having novel means for establishing sealed engagement between a sealing annulus and the outer race, whereby manufacture and assembly of the seal is greatly facilitated.

Anothr object of the invention is to provide a relatively simple seal construction which makes use of a minimum number of parts, and which can be readily manufactured and assembled.

Additional objects of the invention will appear from the following description in which the preferred embodiments have been set forth in detail in conjunction with the accompanying drawings.

Referring to the drawings:

Figure 7 is a view like Figure 1 illustrating another embodiment of the invention which enables certain of the parts to be preassembled before such parts are applied to the ball bearing races.

Figure 8 is a view like Figure 1 but illustrating another embodiment of the invention in which two spring metal annuluses are employed in place of one.

Figure 9 is an enlarged cross-sectional detail illustrating the arrangement incorporated in Figure 8 for establishing sealing relation with the inner ball bearing race.

Figure 10 is a view like Figure 1 but illustrating another embodiment of the invention in which a separate part is employed for forming a sealing surface on the inner ball bearing race.

Figure 11 is an enlarged cross-sectional detail illustrating a modification for establishing sealing relation with the outer ball bearing race, and applicable to the embodiments of Figures 1, 7 and 9.

Figure 1:
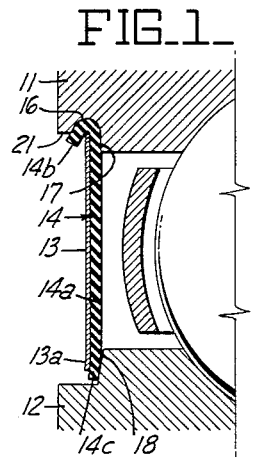
Figure 1 is a cross-sectional detail illustrating one embodiment of the present invention.
Figure 2:
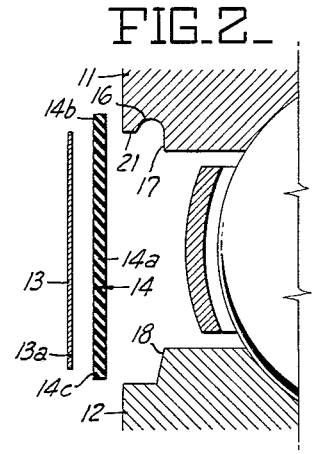
Figure 2 is an exploded view illustrating the parts of the seal shown in Figure 1.
Figure 3:
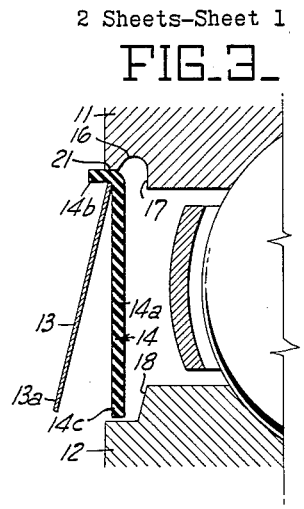
Figure 3 is a view like Figure 2 but showing how the parts are assembled.

Referring to Figures 1 to 3 inclusive, I have illustrated a ball bearing assembly including the outer and inner races 11 and 12. As sealing means for the ball bearing assembly I have shown an annulus 13 which is formed of relatively thin spring metal. In conjunction with member 13 there is a member 14 which is formed of suitable resilient material, such as a suitable synthetic rubber. The resilient rubber member consists of one portion 14a which extends completely over the inner face of the spring metal annulus 13, and another portion 14b which embraces the outer periphery of the spring metal annulus and which is seated in a groove 16 formed in the outer race 11. The groove 16 is formed immediately in front of an annular shoulder face 17, likewise formed on the outer race.

The inner race 12 is machined to form the shoulder face 18, which is preferably on a small angle of from 3 to 9° to a plane at right angles to the axis of the assembly. The inner margin 14c of the rubber part 14 overlaps and is normally pressed into sealing relation with the shoulder face 18. The inner diameter of the spring metal annulus 13 is preferably such that a margin 13a of the same is in overlapping relation with the shoulder face 18. In the completed assembly the annulus 13 is stressed by lateral deflection of the same within its elastic limit, whereby the inner margin 13a is urged toward the shoulder face 18. The pressure thus developed serves to maintain sealing contact between the resilient rubber member and the shoulder face 18.

The parts described above are preferably constructed and assembled as illustrated in Figures 2 and 3. The member 14 is formed of flat sheet rubber stock as by a suitable punching operation. The outer diameter of the spring metal annulus 13 is slightly greater than the diameter of the cylindrical surface 21 of the outer ball bearing race. The spring metal annulus can be formed of suitable sheet metal as by a punching operation. Thus metals or alloys such as high carbon steel, Phosphor bronze or the so-called stainless steels can be used. In practice for the common bearing sizes, the annulus can range in thickness from say 0.003 to 0.008 inch.

Figure 4:
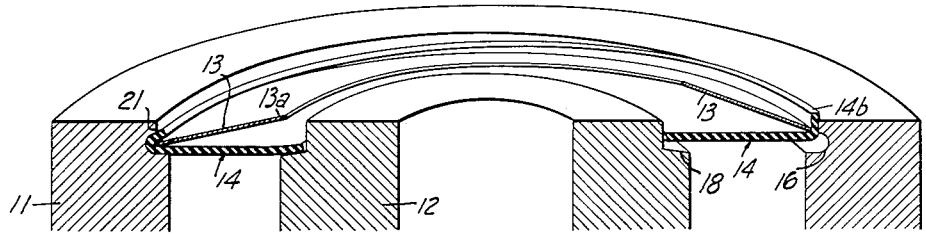
Figure 4 is a perspective view illustrating how the parts are assembled.
Figure 5:
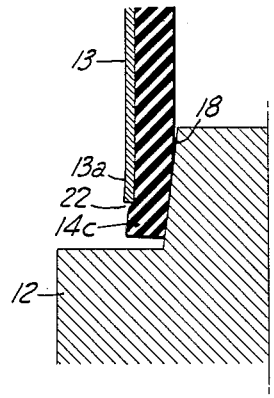
Figure 5 is a greatly enlarged cross-sectional detail illustrating the arrangement for establishing sealing relation with the inner ball bearing race.

Figures 3 and 4 illustrate how the parts of Figure 2 are assembled. The annulus 13 is fitted into the groove 16 by springing it to cupped form as illustrated in Figure 4. As a peripheral edge of the annulus is forced into the bore 21, the resilient rubber annulus 14 is carried into the outer race substantially in the manner illustrated in Figure 3. Thus after the spring metal annulus has been cupped and its entire periphery snapped into the groove 16, the resilient annulus 14 has been bent to embrace the periphery of the spring metal annulus, with some radial compression of the resilient rubber to thereby form a fluid tight seal between the annulus and the surface of the groove 16. As the parts are finally positioned the spring metal annulus 13 is sprung laterally within its elastic limit, so that its inner margin presses against the adjacent resilient rubber, or in other words pressure is applied to urge the resilient rubber against the annular face 18. As illustrated in Figure 5 this pressure actually causes some compression of the rubber with the result that a slight indentation 22 is formed in the outer face of the rubber and along the inner periphery of the spring metal annulus 13. Such an indentation is desirable in that it tends to prevent outward creeping of the resilient rubber when the seal is in use.

It will be evident from the foregoing that my seal possesses advantages which are not found in prior art seals of the type making use of one or more resilient rubber members. In the event the margin 14c of the rubber member tends to harden or take a permanent set, this does not directly affect the seal established against the annular face 18 by virtue of the stressing of the spring metal annulus 13. The fact that the resilient rubber member 14 is formed of flat rubber stock makes possible manufacture at relatively low cost, and greatly facilitates manufacture and assembly without rubber molding operations.

Figure 6:
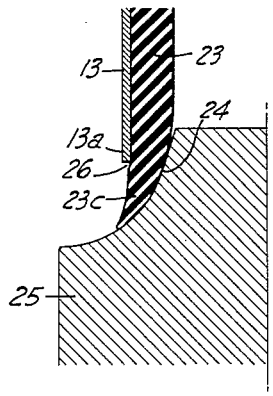
Figure 6 is a view like Figure 5 but illustrating a modification of the invention.

As illustrated in Figure 6, the inner margin of the rubber part 23 can be in the form of a feathered edge 23c which engages a fillet-like surface 24 formed on the inner race 25. It will be noted that the resilient rubber is likewise indented, as indicated at 26, by the pressure applied from the spring metal member 13, and this tends to avoid creeping of the resilient rubber member which might otherwise tend to occur to the point of interfering with proper sealing relationship.

In the embodiment of Figure 7 the outer race 28 is provided with a recess 29 which forms the annular shoulder face 30. Within the recess there is an assembly comprising the spring metal member 13, the resilient rubber member 14, and the metal retaining member 31. Member 31 is formed of suitable pressed metal and is substantially U-shaped in cross-sectional contour. It is dimensioned to have a press fit within the recess 29, thus providing sufficient retention for holding the assembly in place, and also providing fluid tight relationship. In effect the member 31 forms a groove corresponding to the groove 16 of Figure 1, and which serves to accommodate the resilient rubber portion 14b. The parts 13 and 14 together with the metal retaining member 31 can be assembled in the manner previously described with reference to Figure 2, after which this assembly is positioned within the recess 29 of the outer ball bearing race as shown in Figure 7.

Figure 8 illustrates another embodiment of the invention in which the assembly provides both metal to metal, and metal to rubber, sealing surfaces. Thus the parts 13 and 14 are substantially as shown in Figure 1, and they can be assembled in the outer and inner ball bearing races in the same manner. An additional relatively thin spring metal member 33 is positioned over the inner face of the resilient rubber member 14. The inner peripheral edge portion of annulus 33 is in overlapping relation with the face 18. Both the annuluses 13 and 33 are stressed laterally within their elastic limits whereby they normally press in a direction toward the annular face 18. Thus a metal to metal seal is established between the inner peripheral margin of annulus 33 and shoulder face 18, and a rubber to metal seal is established between the rubber margin 14c, and the face 18. The relationship just described is illustrated more clearly in Figure 9. Note the slight indentation in the rubber as indicated at 34, and which corresponds to the indentation 22 of Figure 5.

In the embodiment of the invention illustrated in Figure 10 the spring metal and rubber parts are substantially the same as in Figure 1, except that the spring metal part 35 has about the same internal diameter as the rubber part 14. Instead of providing a special face 18 machined on the inner race, a special metal annulus 36 is provided, which has a press fit over the cylindrical surface 38 of the inner race 39. Member 36 is formed of suitable pressed metal and can be L-shaped in cross-sectional contour. Its outer face forms a face 37 which corresponds to the face 18 of Figure 1. The inner margins of the annuluses 35 and 14 engage the surface 18 the same as in Figure 1.

It will be evident that with the arrangement of Figure 10 it is not necessary to provide special machining for the inner race. The special surface for forming sealing engagement is formed entirely by the member 36. The axial positioning of the member 36 relative to the inner race 39 can be used to determine the amount of lateral deflection of the spring metal annulus 35 and the resulting amount of pressure developed to urge the resilient member against the member 36.

In Figure 10 it is desirable to provide the rubber part with fabric or other suitable reinforcing 40 in order to prevent radial expansion of the inner diameter.

Figure 11 illustrates modified means for forming sealing engagement between the parts of the assembly and the outer race. In this instance the outer race 41 is provided with a groove 42, which is adjacent to the shoulder face 43. The resilient member 44 has its portion 44b seated within the groove 42, and embracing the outer periphery of the spring metal annulus 46. Instead of dimensioning the annulus 46 for snap assembly into the groove 42 in the manner described with reference to Figures 2 to 4 inclusive, a special annular retainer 47 is employed. This retainer can be formed of suitable pressed metal which is substantially U-shaped in cross-sectional contour. It is dimensioned to be slightly less in diameter than the diameter of the bore 48 in the outer race. The member 46 is dimensioned with respect to its external diameter whereby in final position it retains the rubber portion 44b in the groove 42. At the same time however this dimensioning is such that assembly can be made within the outer race by exerting some pressure to cause the resilient portion 44b to be temporarily compressed to thereby pass the bore 48.

In describing the embodiment illustrated in Figures 8 and 9, reference has been made to establishing a direct metal to metal contact between the spring metal annulus 33 and the shoulder face 18. While it is possible to have a direct metal to metal contact, I prefer to provide the inner face of the annulus with a thin flexible composite coating which will reduce friction and wear. A good coating material is one consisting of a number of divided solid ingredients, including graphite and one or more divided metals in flake form, which are bonded together in a homogeneous mass by a thermally set synthetic resin.

The following is an example of a formula which can be used with good results as an antifriction coating material:

5 grams phenolformaldehyde resin in the form of a powder
0.4 gram amorphous graphite
1.7 grams lead in flake form having a particle size of about 320 mesh
1.7 grams copper in flake form having a particle size of about 320 mesh The above ingredients are homogeneously mixed together and the resin content dissolved with a suitable solvent such as a mixture of ethyl, isopropyl and butyl alcohols. Thus a fluid mixture is provided which can be sprayed, brushed on, or applied by dipping. The surface to be coated is first suitably cleaned, as by sanding or sandblasting and then the above fluid composition applied. After applying one or more coats, followed by air drying, the coating is cured by heating the same in a suitable oven to a temperature of the order of 300° F. or higher, to thermally set the resin. The thickness of such a coating may be of the order of 0.001 to 0.002 inch.

Reference is made to my copending application Serial No. 63,579 filed December 4, 1948 for "Bearing Assembly and Seal," now U. S. Patent 2,600,433, issued June 17, 1952, and my copending application Serial No. 136,589 filed January 3, 1950 for "Lubricant Seal," now abandoned.

I claim:

1. In a lubricant sealing assembly, outer and inner annular concentric members, a lubricant sealing means extending between said members and including a substantially flat thin spring metal annulus, an annular groove interrupting the inner periphery of the outer member and disposed in substantially the same plane as the plane of the annulus, and a member of resilient material having one portion of the same bent over the outer periphery of said annulus and engaging in said groove and having another portion of the same extending over one face of the annulus, said resilient member before assembly being a substantially flat rubber annulus of substantially uniform thickness, said spring metal annulus being insertable together with said resilient member into operative engagement within the groove by distortion of the annulus from its normally flat form and within its elastic limit, insertion of the annulus together with said resilient member into said groove serving to cause the outer margin of the resilient member to be bent over the outer periphery of the annulus said bent over margin forming a resilient mounting for the metal annulus which holds the metal annulus in interlocked and non-rotatable relation to the outer concentric members.

2. In a lubricant sealing assembly, outer and inner annular concentric members, a lubricant sealing means extending between said members and including a thin spring metal annulus, an annular groove interrupting the inner periphery of the outer member and disposed in substantially the same plane as the plane of the annulus, and a member of resilient rubber having one portion of the same bent over the outer periphery of said annulus, and engaging in said groove, said resilient member having another portion of the same extending over one face of said annulus and inwardly to form a margin extending beyond the inner periphery of said annulus, said annulus being stressed laterally to cause the same to urge the inner margin of the resilient member into sealing engagement with the inner concentric member, said resilient member before assembly being a substantially flat resilient rubber annulus of substantially uniform thickness, said spring metal annulus being insertable together with said resilient member into operative engagement with the groove whereby distortion within its elastic limit from its normally flat form, insertion into said groove serving to cause the outer margin of the resilient member to bend over and seal with respect to the outer periphery of the annulus said bent over margin forming a resilient mounting for the metal annulus which holds the metal annulus in interlocked and non-rotatable relation to the outer concentric members.

3. In a lubricant sealing assembly, outer and inner annular concentric members, a lubricant sealing means extending between said members and including a thin spring metal annulus, an annular groove interrupting the inner periphery of the outer member and disposed in substantially the same plane as the plane of the annulus, a member of resilient rubber having one portion of the same bent over the outer periphery of said annulus and engaging in said groove, said resilient member having another portion of the same extending adjacent one side face of the annulus, said resilient member before assembly being a substantially flat rubber annulus of substantially uniform thickness, the spring metal annulus being insertable together with said resilient member into operative engagement with the groove by distortion within its elastic limit from its normally substantially flat form, insertion into said groove serving to cause the outer margin of the resilient member to be bent over the outer periphery of the metal annulus and to be sealed with respect to the same, said bent over margin forming a resilient mounting serving to hold the metal annulus in interlocked and non-rotatable relationship with respect to the outer concentric member, and an annular sealing surface formed on the inner one of said concentric members and disposed in overlapping relation with both the inner annular margins of the spring metal annulus and the resilient rubber member, said spring metal annulus after insertion in said groove being sprung laterally within its elastic limit to urge said margins into sealing contact with said annular surface.

4. In a lubricant sealing assembly, outer and inner concentric members, a lubricant sealing means extending between said members and including a thin spring metal annulus and an annular groove interrupting the inner periphery of the outer member and disposed in substantially the same plane as the plane of the annulus, a member of resilient rubber having an outer margin of the same bent over the outer periphery of said annulus and engaging in said groove, said resilient member having another portion of the same extending alongside one face of the spring metal annulus, said resilient member before assembly being a substantially flat disc-shaped rubber annulus of uniform thickness said spring metal annulus being insertable together with said member in operative engagement with the groove by distortion within its elastic limit from its normally substantailly flat form, insertion into said groove serving to cause the outer margin of the member to be bent over and sealed with respect to the outer periphery of the annulus, and to form resilient means for holding the spring metal annulus locked in said groove and in non-rotatable relationship with the outer concentric member, an annular surface formed on the inner concentric member and being disposed immediately in overlapping relation with the inner annular margins of said spring metal annulus and said last named portion of the rubber member, said spring metal annulus being stressed laterally within its elastic limit to urge said margins into sealing relation with said surface, the inner peripheral edge of said last named portion of said resilient rubber member being on a diameter less than the inner diameter of the spring metal annulus to provide an edge portion which extends inwardly beyond the inner edge of said spring metal annulus.

References Cited in the file of this patent

UNITED STATES PATENTS

| | | |
|---|---|---|
| 734,140 | Schram | July 21, 1903 |
| 1,891,706 | De Ram | Dec. 20, 1932 |
| 2,202,770 | Brodin | May 28, 1940 |
| 2,245,474 | Hately | June 10, 1941 |
| 2,428,041 | Saywell | Sept. 30, 1947 |
| 2,467,049 | Peterson | Apr. 12, 1949 |